United States Patent [19]

Meedom

[11] 4,022,568

[45] May 10, 1977

[54] METHOD AND APPARATUS FOR HEAT TREATING PULVEROUS RAW MATERIALS

[75] Inventor: Halvor Meedom, Copenhagen Valby, Denmark

[73] Assignee: F. L. Smidth & Co., Cresskill, N.J.

[22] Filed: Aug. 11, 1975

[21] Appl. No.: 603,867

[30] Foreign Application Priority Data

Aug. 12, 1974 Denmark .......................... 4272/74

[52] U.S. Cl. .............................. 432/14; 432/106; 432/58; 106/100
[51] Int. Cl.² ...................................... F27B 7/02
[58] Field of Search ............... 432/14, 58, 106, 80, 432/78, 85; 106/100; 34/57 A, 57 R

[56] References Cited

UNITED STATES PATENTS

| | | | |
|---|---|---|---|
| 3,145,094 | 8/1964 | Nakajima | 432/58 |
| 3,664,650 | 5/1972 | Weber et al. | 432/58 |
| 3,836,323 | 9/1974 | Engel | 432/106 |
| 3,864,075 | 2/1975 | Christiansen | 432/106 |
| 3,881,861 | 5/1975 | Ritzmann | 432/106 |
| 3,910,754 | 10/1975 | Weber et al. | 432/14 |
| 3,938,949 | 2/1976 | Christiansen | 432/106 |
| 3,940,241 | 2/1976 | Houd | 432/106 |

FOREIGN PATENTS OR APPLICATIONS 1,334,714  10/1973  United Kingdom ................. 432/58

*Primary Examiner*—John J. Camby
*Assistant Examiner*—Henry C. Yuen
*Attorney, Agent, or Firm*—Pennie & Edmonds

[57] ABSTRACT

A method is disclosed for heat treating pulverous raw material such as cement raw meal prior to subjecting it to further heat treatment such as sintering. By directing the raw material to a multi-stage preheater having a final stage which comprises at least two substantially equivalent sub-stages and directing hot gases to the preheater in a manner to contact the raw material, an effective heat exchange between the raw material and the hot gases is achieved. The raw material is directed from the penultimate preheater stage so as to be entrained in the hot gases prior to directing the hot gases to the sub-stages of the final stage of the preheater and the hot gases and entrained raw material are divided into substantially equal divisional flows with each divisional flow being associated with a sub-stage of the final stage. Each divisional flow is directed to an associated sub-stage of the preheater final stage and each flow is deprived of the raw material therein in a manner to produce individual, separate and substantially equal continuous sub-flows of raw material. An apparatus is disclosed for practicing the inventive method and a rotary kiln plant is disclosed in which the inventive apparatus is incorporated to produce cement clinker by practicing the method of the invention according to the preferred embodiment.

20 Claims, 2 Drawing Figures

METHOD AND APPARATUS FOR HEAT TREATING PULVEROUS RAW MATERIALS

BACKGROUND OF THE INVENTION

1. Field of the Invention

This invention relates to improvements in heat treating pulverous raw material such as cement raw meal, lime, aluminum oxide and the like.

2. Description of the Prior Art

In the technology pertaining to the heat treatment of pulverous raw material it is often desirable, if not necessary, to divide a flow of the hot pulverous material into two or more parallel, equal material sub-flows. Thus it may be necessary to subject the pulverous material to two successive heat treatments of a different nature. For example, the material may be subjected to a preheating treatment which is succeeded by a calcining, of which at least the first heat treatment takes place by heat exchange with a hot gas in which the pulverous material is suspended. Further, it may be advantageous to carry out the preheating in one suspension heat exchanger and to effect the subsequent calcination in two or more heat treatment units (calciners) working in parallel. It is therefore of great significance to separate the flow of hot pulverous material after being subjected to the initial heat treatment in the suspension such that it can be passed to the succeeding two or three heat treatment units in separate flows which are of substantially equal volume and temperature.

One technique which has been employed to divide the flow of material into at least two equal sub-flows has been to insert an adjustable flap damper of known construction into the discharge pipe of the suspension heat exchanger and to divide the pipe into two parallel pipes beneath the flap damper. By proper adjustment of this damper — and by re-adjustment — e.g. automatically — from time to time it should be possible always to ensure two identical flows of material through the two discharge pipes beneath the damper. However, this has proven to be a solution that is not satisfactory under actual working conditions. For example it is unreliable and complicated. Further, it requires constant — e.g. automatic — attention, and is hardly practical if division into three or maybe four flows is demanded.

It should also be noted that the chief objection to the use of a steel flap damper is that the temperature of the pulverous material to be divided is often very high, of the order 800°–900° C, and these temperatures have been found to be so high that an ordinary flap damper of steel construction would soon be destroyed.

The temperature in the lowermost part of the suspension heat exchanger, which is made of steel, is also very high, but the exposed parts — which include internal and external connecting pipes — are always provided with a refractory lining, and are consequently not damaged. It has been determined that even though the damper and the casing in which it is placed were made of fire-resistant, alloy steel, the durability thereof would be extremely restricted. For example, if these parts were made of ceramic fire-resistant material or clad with such a material, the damper structure would be heavy abnd clumsy, and it would be impossible to make it gas-proof. Similar objections have been advanced with respect to a hollow water cooled damper placed in a casing with hollow, water-cooled walls.

It is therefore clear that the use of a flap damper does not provide a satisfactory solution of the problem. Moreover, up to the present, no known satisfactory solution to this problem has yet been advanced.

U.S. Pat. No. 3,881,861 to Ritzmann (which corresponds to German Pat. No. 2.247.172) relates to an Apparatus For The Manufacturing Of Cement. Cement raw material exiting the penultimate stage of a preheater is divided into two streams by subjecting the flow to a counterflow of gas and by permitting the entrained raw material to pass into either of two sub-pipes which branch from the main riser pipe. The material flows into final preheater sections and into an idling chamber wherein the preheated raw material is kept circulating in a stream of hot gas for a predetermined time before entering a rotary tube furnace via a flap damper of the type heretofore described. U.S. Pat. No. 3,317,201 to Heins-Gert Muller et al relates to a Method Of And Arrangement For Increasing The Alkali Content In Alakl: Laden Dusts Of Flue Gases. Cement raw material is passed through successive stages of a preheater countercurrent to a flow of hot gas. In the upper stages of the preheater the material flowing from one stage is divided into two unregulated flows and reunited in the succeeding stage and this process ceases at the penultimate stage. I have devised a method and apparatus which are particularly suitable for incorporation as part of a rotary kiln plant which readily and efficiently achieves the desirable separate division flows of material while substantially avoiding the disadvantages of the prior art.

SUMMARY OF THE INVENTION

A method of heat treating pulverous raw material prior to subjecting it to further heat treatment such as calcination, comprising directing the raw material to a multi-stage preheater having a final stage including at least two substantially equivalent sub-stages. Hot gases are directed to the preheater in a manner to contact the raw material so as to effect a heat exchange between the raw material and the hot gases. The raw material is directed from the penultimate preheater stage so as to be entrained in the hot gases prior to directing the hot gases to the sub-stages of the final stage of the preheater. The method further comprises dividing the hot gases and entrained raw material into substantially equal divisional flows, with each divisional flow being associated with a sub-stage of the final preheater stage, and directing each of the divisional flows to an associated sub-stage of the preheater final stage. According to the inventive method, the preheated raw material is separated from the divisional gas flows in the sub-stages of the preheater final stage in a manner to produce individual, substantially separate and equal sub-flows of raw material which may be directed separately to a rotary kiln for further heat treatment such as a finishing calcination, sintering and the like. The particular heat treatment to which the raw meal is subsequently subjected is dependent upon the particular type of raw meal.

Thus it will be seen that the method according to the invention relates to dividing the gas flow directed to the main preheater into as many sub-flows as is desired to divide the flow of material into the same number of flows. These gas sub-flows are each advanced separately under heat exchange with the material suspended in the gas sub-flow. After being repeatedly suspended in, and separated from, hot gas, the pulverous raw material will have attained a high temperature due to the repeated heat exchange with the gas. This material is subsequently separated from each gas sub-flow so as to form the desired separate, substantially equal, continuous material sub-flows.

Experience dictates that if the ducts through which the gas sub-flow is conveyed (after division) are uniform — that is they are of identical cross-section and cross-sectional area — the gas sub-flows will be of equal size and contain equal amounts of suspended pulverous material. Also the division will be equally satisfactory whether there are two, three or four such ducts. A direct result hereof, which is also confirmed in practice, is that the sub-flows of material separated from the gas sub-flows will be uniform — or substantially uniform — as desired.

The invention also relates to an apparatus for heat treating pulverous raw material which comprises a first central raw material multi-stage cyclone string preheater having at least two cyclone preheater stages defining a heat exchange zone in which the pulverous material and hot smoke gases are brought into heat exchange relationship. The final stage of the preheater is comprised of at least two preheater sub-stages which accommodate the total amount of final preheating. The apparatus further comprises means to direct hot gases to the central string preheater and means to direct the preheated raw material from the penultimate stage of the central string preheater into the hot gases prior to entering the sub-stages of the preheated final stage. The apparatus also comprises means to divide the flow of hot gases and raw material into separate substantially equal divisional flows, each of the divisional flows being directed to an associated sub-stage of the final stage. A calcining means is associated with each sub-stage of the central string preheater for at least partially calcining the raw material, with means being provided to direct the preheated raw material in the form of separate and equal continuous material sub-flows from each sub-stage of the final stage of the central string preheater to each associated calcining means for calcination of the raw material. An additional cyclone preheater stage is associated with each calciner, and in the preferred embodiment, this additional cyclone stage forms the final preheater stage of an associated additional preheater string which is supplied with heated gases from the associated calciner and from a rotary cement clinker cooler. The apparatus further comprises means to direct the preheated, at least partially calcined raw material from each calciner to its associated additional preheater stage prior to subjecting the material to further heat treatment such as a finishing calcination and/or sintering in a rotary kiln.

It is advantageous that the heat exchange between the pulverous material and the hot gas flow takes place in a suspension heat exchanger of the cyclone type having a cyclone preheater which may have two or more stages. The last, or lowermost stage of the cyclone preheater may — according to the invention — be provided with as many cyclones working in parallel as is desired to divide the flow of material. Thus the gas sub-flows with pulverous material suspended therein are advanced and each is introduced into its separate cyclone while all of these cyclones are connected for parallel operation. These cyclones are then relieved of the pulverous material by continuously removing it from the bottom of each separate cyclone in the form of approximately uniform and continuous sub-flows of material. The gas sub-flows escaping from the tops of the cyclones are reunited — after being relieved of pulverous material — into one gas flow in which pulverous material is suspended at higher levels of the cyclone preheater to be raised in temperature by further heat exchange with the gas flow comprised of the sub-flows. The result obtained is a simple and reliable division of the pulverous flow of material.

The method according to the inventon may advantageously be used within various industries, examples of which include, but are not limited to, those industries which produce burnt lime and aluminum from aluminum oxide. In the preferred embodiment, the invention is utilized in the production of cement clinker from cement raw meal. In the manufacture of cement clinker — which is an intermediate product in the manufacture of cement by the dry process — cement raw meal is subjected to three successive heat treatments, that is, a preheating, a calcining (expulsion of carbon dioxide) and a sintering (burning), which is usually effected in a rotary kiln. It may be expedient to effect the preheating in a single suspension preheater, comprising for example, two or more stages, but to cause the calcination to be effected in two calciners working in parallel. In such case the method of the invention may advantageously be used for dividing the flow of preheated cement raw meal into two sub-flows of equal size, one for each of the two calciners.

Another application of the present method is in the manufacture of burnt lime. In this process ground limestone is used as a starting material and is first preheated and the carbon dioxide subsequently expelled therefrom by calcination. In such case, the method according to the invention may be used if one preheater, but two calciners are used.

In the manufacture of aluminum, aluminum oxide is subjected to calcining. In such case, calcination actually refers to the expulsion of chemically combined water (water of crystallization). This calcining takes place in stages in accordance with stepwise changes in the crystal form until the aluminum oxide is substantially free of water. Thus, the calcining may be effected in stages and the method according to the invention may be used in those cases where the initial stages are effected in one apparatus, and the concluding stages in two or more apparatus working in parallel.

DETAILED DESCRIPTION OF THE PREFERRED EMBODIMENTS

Figure 1:
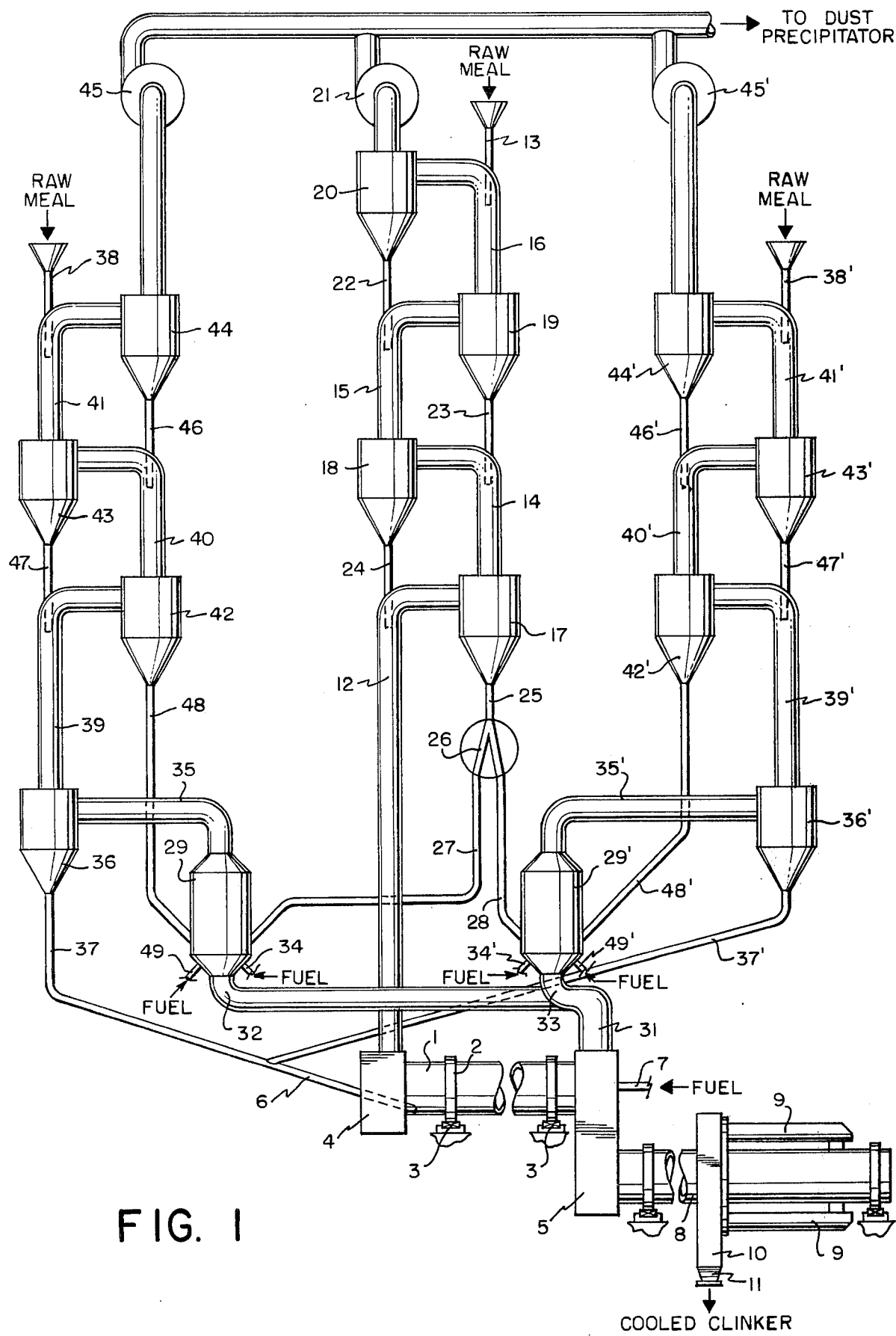
FIG. 1 illustrates a plant for manufacturing cement clinker according to the method of the prior art.

Referring to FIG. 1 a rotary kiln plant constructed according to the prior art is illustrated. In this plant cement raw meal is preheated, calcined, and burned to cement clinker. The kiln is surrounded by live rings 2, being supported by rollers 3, resting on foundations (not shown). At either end the kiln projects into, and is surrounded substantially air-tightly by a casing denoted by 4 at the upper end of the inclined kiln where the calcined raw meal is introduced, and denoted by 5 at the lower kiln end where the clinker leaves the kiln.

The calcined raw meal is introduced into the kiln through a pipe 6, and the fuel necessary for the burning in the kiln — for example, gas, oil, or coal dust — is introduced through a pipe 7 extending into the lower kiln end through the casing 5. A flame formed at the free end of pipe 7 inside the kiln provides heat for burning the cement raw meal to cement clinker.

The clinker thus manufactured falls down inside the casing 5 and is introduced into a clinker cooler, here shown as an independent rotating cooler having a central precooling drum 8 and planetary cooler tubes 9, in which the after-cooling takes place. The free openings of the cooler tubes are surrounded by a casing 10. The cooled clinker falls to the bottom of casing 10 and is subsequently discharged through an outlet 11 in the bottom of casing 10.

A vertical riser pipe 12 emanates from the upper end of the casing 4 and is an integrate part of a cyclone preheater in which the heat content of the exit gases from the rotary kiln 1 is utilized for preheating the raw meal as shown. The raw meal is fed into the preheater through a feed pipe 13, provided with a dosing device. In addition to the aforesaid riser pipe 12, which receives the hot gases from the casing 4, the raw meal preheater also consists of the riser pipes 14, 15 and 16 and of the cyclones 17, 18, 19 and 20. Cyclone 20, positioned at the upper end of the cyclone preheater, is connected to a fan 21 which produces the sub-pressure necessary for driving air sucked in through the planetary cooler tubes through the kiln and the raw meal preheater along the path indicated by the reference numerals: 9, 8, 5, 1, 4, 12, 17, 14, 18, 15, 19, 16, 20, 21. The fan 21 is adjustable so that the draft it creates may be regulated within certain limits.

In the riser pipe 16 the fresh, cold raw meal fed to the raw meal preheater through the pipe 13 meets the ascending exit gases originating from the rotary kiln, and is entrained by the said gases during their passage through the riser pipe 16 into the cyclone 20. A heat exchange between the raw meal and the gases simultaneously takes place with the gases being cooled and the raw meal being heated. In the cyclone 20 gas and raw meal are separated, the gas being sucked into the fan 21, whereas the heated raw meal is introduced into the riser pipe 15 from the cyclone 20 through the tube 22. The identical operation takes place in the riser pipe 15 and the cyclone 19 as in the riser pipe 16 and the cyclone 20, and this is repeated in the riser pipe 14 with its appertaining cyclone 18 and in the riser pipe 12 with appertaining cyclone 17 so that the raw meal preheated over four stages leaves the cyclone 17 through a pipe 25.

Referring further to FIG. 1, a flap damper 26 positioned below the pipe 25 divides the flow of material through the pipe 25 into two sub-flows for pipes 27 and 28 respectively. The two equal flows of preheated raw meal are fed through the pipes 27 and 28, each to its separate calciner 29 and 29' respectively, in which the calcining of the preheated raw meal takes place. During the calcination process carbon dioxide is expelled from the lime-containing component of the raw meal. Fuel and combustion air must be supplied to the calciner for this calcining.

The combustion air used for calcination consists of part of the air which cooled the clinker in the clinker cooler 8. Thus this cooling air is heated when it enters the calciner. The preheated cooling air passes from the cooler 8 through the pipe 31 and into two branch pipes 32 and 33 and further into the two calciners 29 and 29'. Approximately two thirds of the cooling air exiting from the cooler 8 enters pipe 31 while the remaining one third is passed into the kiln 1 to be used as secondary combustion air for nourishing the flame burning in the kiln at the mouth of the burner pipe 7. The fuel for carrying through the calcining in the calciners 29 and 29' is added through pipes 34 and 34'.

In calciners 29 and 29', calcining takes place while the raw meal is suspended in the combustion air, and the calcined raw meal particles exit the two calciners with each flow being directed through its respective separate pipes 35 and 35' with pipes 35 and 35' opening into their respective separate cyclones 36 and 36'. The calcined raw meal is separated in the cyclones from the gases which leave the cyclones at their upper ends. Thereafter these gases are each fed into their respective separate riser pipes 39 and 39' which constitute an integrate part of their respective separate raw meal preheater.

Two additional parallel cyclone preheaters are also provided as shown in FIG. 1. The fresh, cold raw meal which is to be preheated in each of these preheaters is introduced through feed pipes 38 and 38', respectively, equipped with dosing devices as illustrated in FIG. 1. In addition to the aforesaid riser pipes 39 and 39', these two additional raw meal preheaters consist of the riser pipes 40-40', and 41-41' and of the cyclones 42-42', 43-43' and 44-44'. The tops of the two uppermost cyclones are each connected with its separate adjustable fan 45-45', which together with the fan 21 are connected to a joint dust precipitator, in which dust entrained in the gases is collected before the gases are passed into the atmosphere.

The fans 45 and 45' supply the suction power necessary for drawing the cooling air from the clinker cooler through the casing 5, the pipes 31, 32 and 33 and hence along two parallel paths through the calciners 29 and 29' and further along the path denoted 35, 36, 39, 42, 40, 43, 41, 44 and 45 and along the path with the corresponding reference numerals 35', 36', 39', 42', 40', 43', 41', 44' and 45', respectively. Proper adjustment of the fans 21, 45 and 45' will ensure that approximately the same amount of gas passes through the three preheating strings. These preheating strings differ from each other in that the first mentioned string has four stages, whereas the two last mentioned strings have three stages. Further, the first mentioned string is passed by kiln exit gas, whereas the other two strings are passed by preheated cooling air.

The raw meal which has been preheated in the two last mentioned preheaters is introduced into the calciner 29 and the calciner 29', respectively, each through its separate pipe 48 and 48'. Thus, preheated raw meal is supplied to each of these calciners from two sources, partly, in the case of the calciner 29, through the pipes 27 and 48 and partly in the case of the calciner 29', through the pipes 28 and 48'. However, the flow from pipes 27 and 28 is only about one half the flow from pipes 48 and 48'. Further, each calciner has a supply pipe 49 and 49' for introducing fuel therein in addition to the pipes denoted 34 and 34'.

In operation, cement raw meal is preheated by passing through the three parallel preheaters of FIG. 1, with kiln exit gases being used for preheating in the central preheater illustrated, whereas the hot gases in the two other preheaters derive each from its separate calciner with which these two preheaters are provided. Preheated raw meal is fed to each of the calciners, partly from their own preheater and partly from the preheater in which the exit gases from the rotary kiln are utilized.

Figure 2:
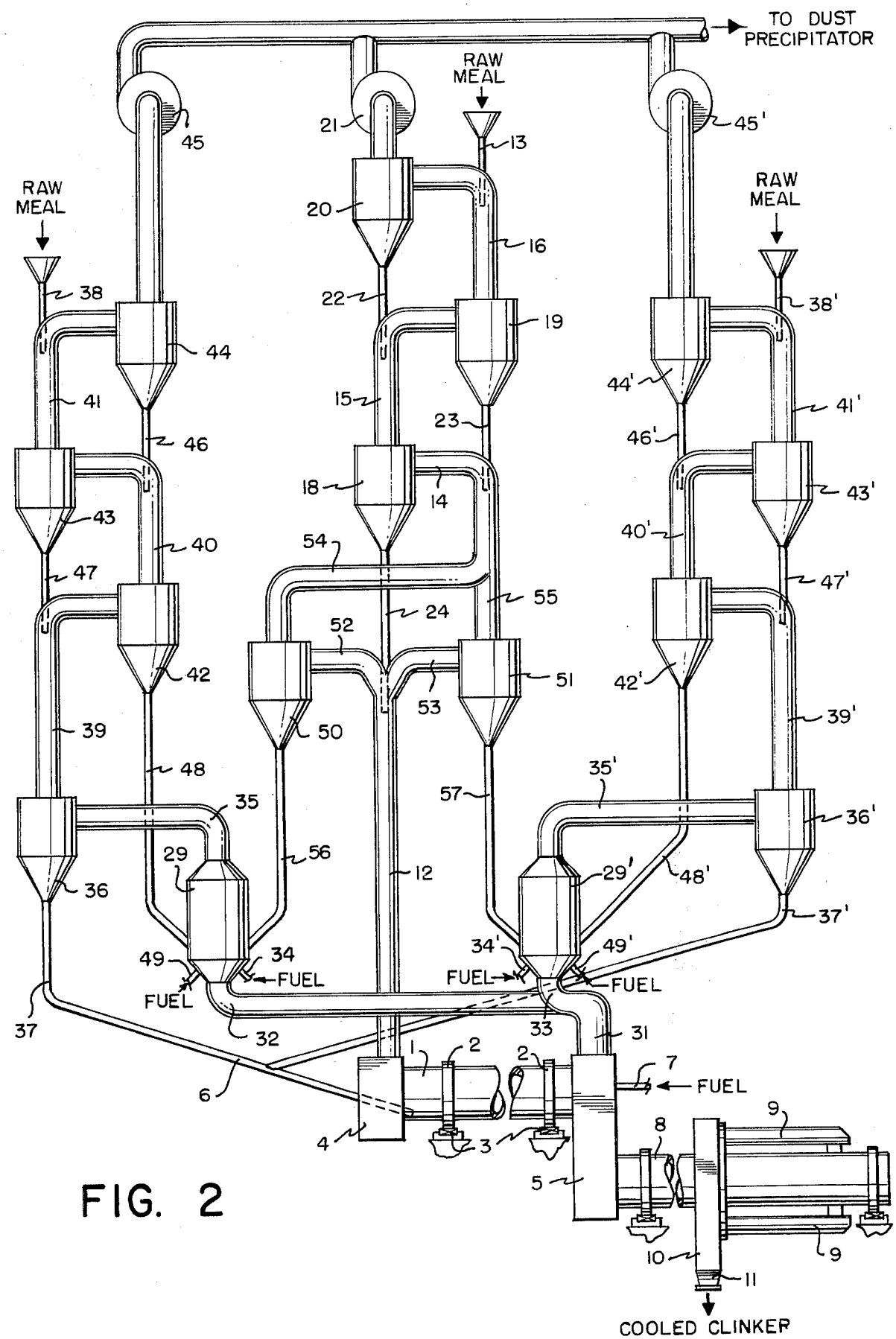
FIG. 2 illustrates a plant for manufacturing cement clinker according to the present invention.

The flap damper 26 with which this plant is equipped gives rise to those problems previously mentioned and those problems are clearly avoided as will be seen in the description of the inventive plant of FIG. 2.

Referring now to FIG. 2, the method and plant of the present invention are illustrated. The plant of FIG. 1 is similar in certain respects to the plant of FIG. 2, and therefore the majority of the reference numerals are identical in the Figs.

Since the processes taking place in the two plants are generally similar, the total process taking place in the plant of FIG. 2 will not be described in detail. It sufficies to say that the riser pipe 12 shown in FIG. 1 is branched into two pipes 52 and 53 in FIG. 2, with each pipe leading to its separate cyclone 50 and 51. As shown in FIG. 2, the tube 53 leads to cyclone 51, while tube 52 — forming a second branch from riser pipe 12 — leads to cyclone 50. Pipes 54 and 55 emanate respectively from the tops of the two cyclones 50 and 51 through which exit gases are carried. The exit gases are carried away from these cyclones 50 and 51 after being relieved of the raw meal particles suspended therein. The two pipes 54 and 55 are united into one pipe 14 after exiting the cyclones 50 and 51. Pipes 56 and 57 which correspond generally to the pipes 27 and 28 in FIG. 1, emanate from the lower portions of the cyclones 50 and 51 and carry preheated raw meal to the calciners 29 and 29'.

The pipes 52 and 53 — into which the exit gases from the kiln flow after passing the riser pipe 12 — are uniform and of identical cross-section and cross-sectional area. Consequently, the gas flow, reaching these two tubes divides into two equal flows, with each tube containing an aqual amount of pulverous material. Since the cyclones 50 and 51 are also similar, and as their respective riser pipes 54 and 55 are also of identical cross-section and cross-sectional area, the amounts of raw meal separated off in these cyclones and carried away through the respective tubes 56 and 57 to the respective calciners 29 and 29', will also be nearly equal. Thus the same distribution of raw meal to the calciners is achieved by the construction according to the invention as by the construction shown in FIG. 1. However, the disadvantages which have been associated with the latter construction are avoided with the inventive plant and method of FIG. 2.

It should be understood that the invention is not restricted to a division of the kiln riser pipe flow into two branches as described in connection with this preferred embodiment. On the other hand it should be made clear that the invention may be practiced by utilizing any number of desired divided separate, substantially equal, continuous flows of material.

I claim:

1. A method of heat treating pulverous raw material by means of a suspension heat exchanger connected to the material inlet end portion of a rotary kiln including a first multi-stage cyclone string preheater having at least two cyclone preheater stages defining a heat exchange zone in which pulverous raw material is brought into heat exchange relationship with hot gases, said first string having a lowermost preheater stage which comprises at least two substantially equivalent sub-stages, at least one additional multi-stage cyclone string preheater associated with each sub-stage of said lowermost preheater stage of said first preheater string and arranged in parallel relation therewith, means to supply raw material to each of said multi-stage cyclone string preheaters, and means for directing preheated material to the rotary kiln for further heat treatment comprising:
   a. directing raw material to said multi-stage cyclone string preheaters;
   b. directing hot gases to each of said preheaters in a manner to contact said raw material so as to effect heat exchange between said raw material and said hot gases;
   c. directing material from the penultimate preheater stage of said first string preheater so as to be entrained in hot gases prior to directing hot gases to said sub-stages of said lowermost stage of said first central string preheater;
   d. dividing said hot gases and entrained raw material in said first string preheater into substantially equal divisional flows, each divisional flow being associated with a sub-stage of said lowermost stage;
   e. directing each of said divisional flows to one of said sub-stages of said lowermost stage of said first string preheater;
   f. separating the preheated material from said divisional gas flows in said sub-stages of said lowermost stage of said first string preheater in a manner to produce individual, separate, and substantially equal and continuous sub-flows of material; and
   g. directing the preheated material from said string preheaters to the material inlet end portion of said rotary kiln for further heat treatment therein.

2. The method according to claim 1 further comprising uniting the gas flows from the upper portion of the sub-stages of the lowermost stage of said first mentioned cyclone string pre-heater and directing said united gas flows to the penultimate cyclone stage of said string preheater.

3. The method according to claim 2 further comprising directing hot smoke gases from the material inlet end portion of said rotary kiln into a riser pipe connected thereto, dividing the gas flow from said riser pipe into substantially equal divisional flows, each divisional flow being associated with one of said sub-stages of said lowermost stage of said first string preheater and directing said substantially equal divisional gas flows to said sub-stages.

4. The method according to claim 3 further comprising separating preheated raw material from said substantially equal gas flows in said sub-stages of said final stage of said first mentioned preheater, and feeding said preheated raw material into separate associated calciners for calcining the raw material.

5. The method according to claim 4 further comprising directing the calcined raw material from each respective calciner to said lowermost stage of said associated string preheaters, and separating the preheated and calcined raw material in said lowermost stage of said associated string preheaters prior to feeding said preheated calcined raw material to the material inlet end portion of the rotary kiln.

6. The method according to claim 5 further comprising directing the preheated, at least partially calcined raw material to said rotary kiln for sintering.

7. The method according to claim 6 further comprising directing the sintered raw material from the rotary kiln to a cooler and cooling the preheated raw material in said cooler by directing atmospheric air in a direction countercurrent to the flow of preheated raw material.

8. The method according to claim 7 further comprising directing at least a portion of the preheated cooling air from said raw material cooler to said calciners and utilizing said preheated cooling air to support combustion in said calciners.

9. A method of heat treating pulverous raw material by means of a suspension heat exchanger connected to the upper material inlet end portion of an inclined rotary kiln including a first central multi-stage cyclone string preheater having at least two cyclone preheater stages defining a heat exchange zone in which pulverous raw material is brought into heat exchange relationship with hot gases, said first central string having a lowermost preheater stage which comprises at least two substantially equivalent sub-stages working in parallel, each of said sub-stages communicating with calcining means associated therewith, each of said calcining means further communicating with an additional multi-stage cyclone string preheater associated therewith arranged in parallel to said first central string preheater and each of said associated preheater strings having at least two cyclone preheater stages defining a heat exchange zone, means to supply raw material to each of said multi-stage cyclone string preheaters comprising:
 a. directing the raw material to each of said multi-stage cyclone string preheaters;
 b. directing hot gases through each of said preheaters in a manner to contact said raw material so as to effect heat exchange between said raw material and said hot gases;
 c. directing material from the penultimate preheater stage of said first central string preheater so as to be entrained in hot gases prior to directing hot gases to said sub-stages of said lowermost stage of said first central string preheater;
 d. dividing said hot gases and entrained raw material in said first central string preheater into substantially equal divisional flows, each divisional flow being associated with one of said sub-stages of said lowermost stage;
 e. directing each of said divisional flows to one of said sub-stages of said lowermost stage of said first central string preheater;
 f. separating the preheated raw material from said divisional gas flows in said sub-stages of said final stage of said first central string preheater in a manner to produce individual, separate, and substantially equal and continuous sub-flows of material; and
 g. directing the preheated material from the lowermost stage of each of said string preheaters associated with said sub-stages of said lowermost stage of said first central string preheater to the material inlet end portion of said rotary kiln for further heat treatment therein.

10. A method of heat treating pulverous raw material such as cement raw meal, prior to subjecting it to further heat treatment such as calcination, sintering and the like in a plant including a first central multi-stage cyclone string preheater and at least two additional multi-stage cyclone string preheaters arranged in parallel to the central string, an inclined rotary kiln having an upper end portion for material inlet and gas outlet and a lower end portion, a separate rotary cooling unit communicating with the outlet end portion of the rotary kiln, and at least two calciners, each and every string preheater having at least an uppermost stage and a lowermost stage, the lowermost stage of the central string comprising at least two substantially equivalent sub-stages working in parallel, each sub-stage communicating with a separate calciner and each of said separate calciners communicating with one of said additional multi-stage string preheaters comprising:
 a. directing raw material to the uppermost stage of each preheater;
 b. directing hot smoke gases from the gas outlet end portion of said rotary kiln to said first central multi-stage cyclone preheater in a manner to contact the preheated raw material so as to effect a heat exchange between the raw material and the hot smoke gases;
 c. directing raw material from the penultimate preheater stage of said central string preheater to the hot smoke gases exiting from the kiln so as to be suspended in said hot gases;
 d. dividing said hot smoke gases and raw material suspended therein into a plurality of substantially equal divisional flows, each divisional flow being associated with a sub-stage of said final stage of said first central string preheater;
 e. directing each of said substantially equal divisional flows to a corresponding associated sub-stage of said final stage of said first central string preheater;
 f. separating the preheated raw material from the hot smoke gases in each of said respective sub-stages of said final stage of said central preheater;
 g. feeding said preheated raw material from each sub-stage of said central preheater to an associated calciner for at least partially calcining said raw material;
 h. directing pulverous raw material to each of said additional parallel mult-stage cyclone string preheaters, each additional multi-stage cyclone string preheater being associated with a calciner;
 i. directing hot gases to each of said additional multi-stage cyclone string preheaters from said cooler unit for preheating raw material by heat exchange therein;
 j. feeding the material preheated in said additional multi-stage string preheaters from the penultimate cyclone stage of each additional preheater to its associated calciner;
 k. directing the raw material combined from each sub-stage of said final stage of said central preheater and said corresponding penultimate stage of each additional string preheater to an associated final stage of each associated additional cyclone string preheater subsequent to at least partially calcining said raw material in said calciners;
 l. separating said preheated calcined raw material in said final stages of said additional multi-stage cyclone string preheaters; and
 m. feeding said preheated calcined raw material as separate material flows from the final stage of each of said additional preheater strings into the material inlet end portion of said rotary kiln for subsequent heat treatment therein.

11. The method according to claim 10 further comprising controlling the flow of hot smoke gases emanating through said first central preheater and controlling the flow of preheated cooling air through said additional preheaters by controlling a suction fan connected to the uppermost respective cyclone stages of each of said string preheaters.

12. An apparatus for heat treating pulverous raw material which comprises:
 a. a first raw material multi-stage cyclone string preheater having at least two cyclone preheater stages including an uppermost stage and a lowermost stage, said lowermost stage being comprised of at least two substantially equivalent preheater sub-stages;

b. at least one additional string of multi-stage preheaters associated with each sub-stage of said lowermost stage of said first string preheater, each of said additional string preheaters having at least two cyclone preheater stages including an uppermost stage and a lowermost stage;

c. means to direct raw material to said multi-stage cyclone string preheaters;

d. means to direct hot gases to said first string preheater so as to bring the pulverous material and hot smoke gases into heat exchange relationship in said first string preheater;

e. means to direct preheated raw material from the penultimate stage of said first string preheater into said hot gases prior to entering the sub-stages of said final stage of said central string preheater;

f. means to divide the flow of hot gases and raw material into separate substantially equal divisional flows, each of said divisional flows being directed to an associated sub-stage of said final preheater stage of said string preheater;

g. calcining means associated with each sub-stage of said central string preheater for at least partially calcining the raw material;

h. means to direct the preheated raw material in the form of separate and substantially equivalent raw material sub-flows from each sub-stage of the final stage of said central string preheater to the calcining means associated with each sub-stage for at least partially calcining said raw material;

i. means to feed raw material from the penultimate stage of each of said additional string preheaters to said associated calcining means; and j. means to direct the preheated, at least partially calcined raw material from each calcining means to the lowermost stage of said associated additional multi-stage string preheaters prior to subjecting the material to further heat treatment.

13. The apparatus according to claim 12 further comprising means to direct hot gases and entrained raw material from said calcining means to the final stage of each additional string preheater.

14. The apparatus according to claim 13 further comprising means to direct the at least partially calcined raw material from said final stage of each additional string preheater to an inclined rotary kiln for further heat treatment therein, said rotary kiln having an upper end portion of material inlet and gas outlet and a lower end portion for exiting the final kiln product.

15. The apparatus according to claim 14 further comprising a rotary cooling means communicating with the material outlet end portion of the rotary kiln, said cooling means being adapted to direct cooling air in countercurrent to the flow of raw material therein.

16. The apparatus according to claim 15 further comprising means to direct at least a portion of the heated cooling air from said rotary cooling means to said calcining means associated with each of said additional multi-stage cyclone string preheaters.

17. The apparatus according to claim 16 wherein said rotary cooling means communicates with the material outlet end portion of said rotary kiln in a manner such that a least a portion of the heated cooling air is directed through said kiln to support combustion therein.

18. The apparatus according to claim 17 further comprising:

a. a riser pipe communicating with the hot smoke gas outlet of said rotary kiln, said riser pipe having at least two branch pipes of substantially uniform and equal cross-sectional area connected to its upper end portion to divide the hot smoke gases emanating from said rotary kiln into at least two divisional substantially equal gas flows; and b. means associated with said riser pipe to direct preheated cement raw meal from the penultimate stage of said central multi-stage cyclone string preheater to be entrained in said hot smoke kiln gases prior to the division thereof such that the divided hot smoke kiln gases contain substantially equal amounts of preheated cement raw meal therein.

19. The apparatus according to claim 18 further comprising a variable fan connected to the upper stage of each of said string preheaters with means to selectively control the flow of gases through each string preheater.

20. A rotary kiln plant for heat treating pulverous material such as cement raw meal which comprises:

a. an inclined rotary kiln for burning preheated cement raw meal therein, said rotary kiln having an upper end portion for material inlet and gas outlet and a lower end portion for exiting the final kiln product;

b. a first central multi-stage cyclone string preheater having at least two cyclone preheater stages including a penultimate cyclone stage and a lowermost cyclone stage, said lowermost stage being comprised of at least two substantially equivalent preheater sub-stages working in parallel;

c. means to direct hot smoke kiln gases from the gas outlet end portion of the rotary kiln to said central multi-stage cyclone preheater;

d. means to direct preheated cement raw meal to be entrained by said hot smoke kiln gases prior to entering said firt central multi-stage string preheater;

e. means to divide the flow of hot smoke kiln gases and entrained cement raw meal into at least two separate substantially equal divisional flows, each divisional flow corresponding to a sub-stage of said lowermost stage of said first central string preheater;

f. means to direct each of said divisional flows and entrained raw meal into an associated sub-stage of said lowermost stage of said first central string preheater;

g. a calcining chamber associated with each sub-stage of said final cyclone stage of said first central string preheater;

h. means to feed raw meal separated from said divisional flows from each respective sub-stage of said final stage of said first central string preheater to each associated calcining chamber;

i. at least one additional multi-stage cyclone string preheater associated with each calcining chamber, said additional string preheaters each having at least two cyclone stages;

j. a rotary cooler communicating with the material outlet end portion of said rotary kiln and adapted to direct cooling air in countercurrent flow to the material exiting from said kiln;

k. means communicating the preheated cooling air from said rotary cooler to each calciner to support combustion in each calcining chamber;
l. means to feed preheated cement raw meal from the penultimate stage of each of said additional string preheaters to its associated calcining chamber;
m. means to direct the preheated cement raw meal from each calcining chamber to the final stage of the associated additional preheater; and
n. means to direct the preheated, at least partially calcined cement raw meal from said additional preheaters as separate material flows to the material inlet end portion of the rotary kiln for a finishing calcination and sintering therein.

* * * * *